United States Patent [19]

Marinoni et al.

[11] Patent Number: 4,763,401
[45] Date of Patent: Aug. 16, 1988

[54] AUTOMATIC TOOL-CHANGING DEVICE FOR INDUSTRIAL ROBOTS

[75] Inventors: Giorgio Marinoni; Pietro Araudo, both of Turin, Italy

[73] Assignee: Comau S.p.A., Turin, Italy

[21] Appl. No.: 71,114

[22] Filed: Jul. 8, 1987

[30] Foreign Application Priority Data

Jul. 16, 1986 [IT] Italy ............................. 67574 A/86

[51] Int. Cl.⁴ ..................... B23Q 3/155; B25J 15/04
[52] U.S. Cl. ................................. 29/568; 279/4; 279/119; 901/30; 901/37; 901/39; 901/42
[58] Field of Search ................. 901/30, 31, 36, 39, 901/41, 42, 37; 29/868; 279/4, 111, 119; 439/886, 887

[56] References Cited

U.S. PATENT DOCUMENTS

| | | | |
|---|---|---|---|
| 4,026,627 | 5/1977 | Benasutti | 439/887 X |
| 4,434,990 | 3/1984 | Kobayashi | 279/4 |
| 4,512,709 | 4/1985 | Hennekes et al. | 901/41 X |
| 4,551,903 | 11/1985 | Bisiach | 901/42 X |
| 4,582,331 | 4/1986 | Röhm | 279/4 |
| 4,604,787 | 8/1986 | Silvers, Jr. | 901/30 X |
| 4,637,121 | 1/1987 | Wortmann | 29/568 |
| 4,664,588 | 5/1987 | Newell, Jr. | 901/41 X |

Primary Examiner—Gil Weidenfeld
Assistant Examiner—Steven C. Bishop
Attorney, Agent, or Firm—Pennie & Edmonds

[57] ABSTRACT

An automatic tool-changing device for industrial robots includes a gripper member located at the end of the robot arm and a coupling flange to which a tool is fixed. The gripper member has radially-movable engagement teeth adapted for insertion in projecting appendages carried by the flange, upon automatic clamping of the tool. The movement of the engagement teeth is driven by a pressurized-fluid jack housed in the gripper member.

13 Claims, 2 Drawing Sheets

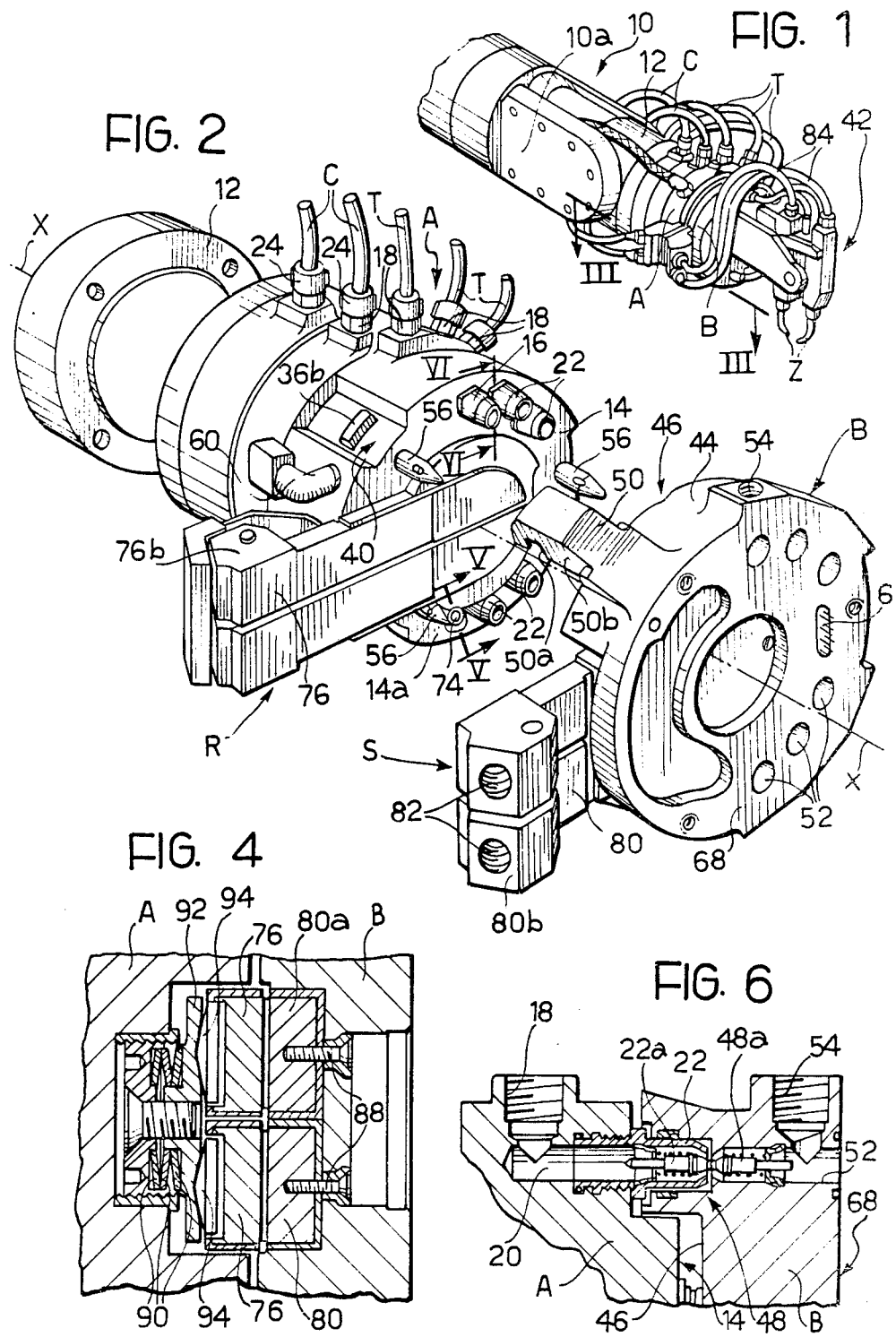

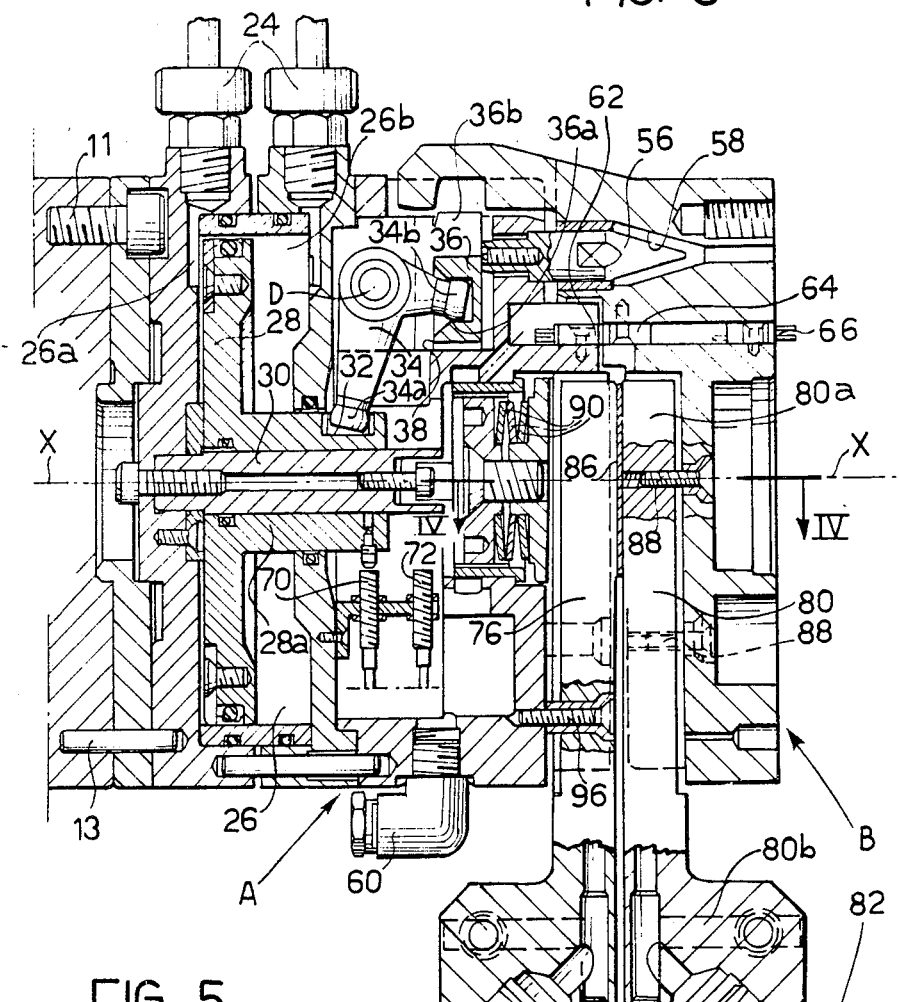
FIG. 3
FIG. 5
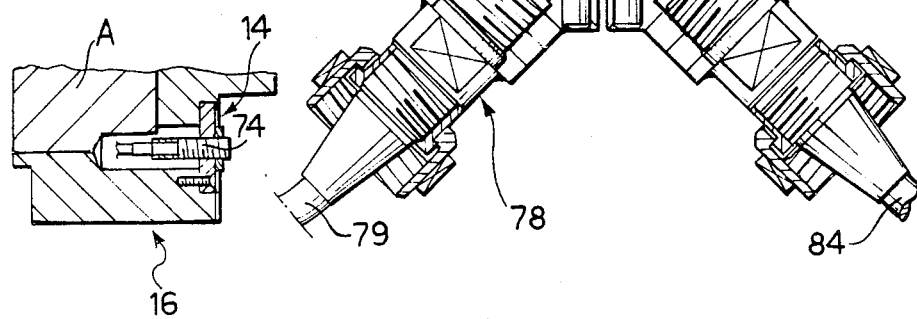

AUTOMATIC TOOL-CHANGING DEVICE FOR INDUSTRIAL ROBOTS

DESCRIPTION

The present invention relates to an automatic tool-changing device for industrial robots having a tool-carrying arm.

Devices made until now include actuator means for effecting the changing of the tool, which are located on the floor or associated with a support structure for the tools. In other words, each tool has an associated corresponding floor actuator which clamps/releases the tool whenever the robot arm is located in correspondence with the tool itself. In other devices a spindle of the robot is engaged to effect the clamping and releasing of the tool.

This results in considerable structural complication, increased bulk of the tools and their actuators disposed on the floor, and high costs.

The object of the present invention is to provide a device of the aforesaid type which is functional and reliable, and at the same time does not have the said disadvantages but is simple and cheap to manufacture.

According to the invention, this object is achieved by virtue of the fact that the device comprises a cylindrical holder member supported by the tool-carrying arm, a coupling flange which has a shape substantially complementary to that of the holder member and to which a tool is fixed, movable engagement means associated with the holder member, catch means associated with the flange and complementary to the movable engagement means, and actuator means carried by the holder member and associated with the movable engagement means to clamp the flange to or release it from the holder member.

By virtue of these characteristics, it is not necessary to provide a clamping actuator for each tool on the floor, since the actuator itself is located on the machine. It is thus possible to locate a greater number of tools on the floor, this term meaning any structure not on the machine, to give greater flexibility of the robot in use.

Preferably, the movable engagement means include movable engagement teeth disposed radially with respect to the holder member and slidable radially relative thereto.

According to another characteristic, the catch means include a plurality of fixing appendages in the form of hooks having a shape complementary to the engagement teeth and projecting axially relative to the flange.

Further advantages and characteristics of the device according to the invention will become clear from the detailed description which follows, provided purely by way of non-limiting example, with reference to the appended drawings in which:

FIG. 1 is a perspective view of the end of a tool-carrying arm provided with the device according to the invention, FIG. 2 is a partially-exploded perspective view of a detail of FIG. 1, FIG. 3 is a partially-sectioned view taken on the line III—III of FIG. 1, FIG. 4 is a section taken on the line IV—IV of FIG. 2, in the coupled configuration of the device, FIG. 5 is a section taken on the line V—V of FIG. 2, and FIG. 6 is a section taken on the line VI—VI of FIG. 2, in the coupled configuration of the device.

With reference to the drawings, a movable arm of an industrial robot is indicated 10 and has, at its end 10a, a safety flange 12 of known type provided with safety microswitches which automatically stop the robot from operating when the load on the tool surpasses a predetermined value. A cylindrical holder member, generally indicated A, is fixed to the safety flange 12 by screws 11 and 13 and has a frontal surface 14 and a circular cylindrical side surface 16.

Connectors 18 for connection to operating-fluid lines T are disposed on the side surface 16 of the member A. The connectors 18 are connected by ducts 20 within the holder member A to male-type rapid-engagement connectors 22 disposed in correspondence with an annular peripheral portion 14a of the frontal surface 14. Two connectors 24 for connection to compressed-air lines C are also provided on the side surface 16 of the member A.

The two connectors 24 communicate with a circular cylindrical chamber 26 within the holder member A, which is divided into two portions, 26a and 26b respectively, by a double-acting piston 28 having a tubular rod 28a slidable on a cylindrical central guide shaft 30. The rod 28a of the piston 28 has three shaped lateral seats 32 disposed at 120° from each other.

Three cranked levers 34 are articulated at D within the holder member A about articulation axes perpendicular to the axis of the cylindrical holder member A, indicated X—X in the drawings. Each cranked lever 34 has a first shaped end 34a housed in the corresponding seat 32 of the rod 28a and a second shaped end 34b inserted in a corresponding recess 36a in a movable engagement tooth 36. The engagement teeth 36, which are angularly spaced by 120° from each other, can slide in suitable radial guides 28 within the holder member A and have an end portion 36b arranged to project radially in correspondence with the side surface 16 of the holder member A.

In correspondence with each engagement tooth 36, the side face 16 of the holder member A has an axial recess 40 the function of which will be explained in the description below.

The holder member A can be coupled to a flange B to which a tool, constituted by a resistance-welding gun 42 in the embodiment of FIG. 1, is fixed. The coupling flange B has a frontal surface 46, a fixing surface 68 for the mounting of the gun 42, and a circular cylindrical lateral surface 44 with three engagement appendages 50 disposed at 120° from each other and projecting axially relative to the frontal surface 46. The engagement appendages 50, termed jaws below, each have a transverse recess 50a.

Female-type rapid-engagement connectors 48 are disposed on the frontal surface 46 of the flange B and communicate, through ducts 52 for the operating fluids, with corresponding connectors 54 disposed on the lateral surface 44 of the flange B. The rapid-engagement connectors 22 of the holder member A and the complementary rapid-engagement connectors 48 of the flange B have respective obturators 22a, 48a associated with respective helical springs arranged, in known manner, to allow communication between the connectors in the coupled condition of the connectors themselves, as illustrated in FIG. 6.

In order to facilitate correct coupling and allow a high load transmission between the holder member A and the coupling flange B, three cylindrical-conical pins 56 are disposed on the frontal surface 14 of the member A at 120° from each other, these pins being complementary to seats 58 formed in the frontal surface 46 of the flange B.

The electrical connections between the member A and the flange B will now be described.

The holder member A has, in correspondence with its side surface 16, a multiple connector 60 for electrical cables for the transmission of control and command signals to the tool 42. Some of these electrical cables are connected to a pin 62 located on the frontal surface 14 of the holder member A complementary to a socket 64 on the frontal surface 46 of the flange B. The socket 64 is connected in turn to a pin 66 disposed in correspondence with the fixing surface 68 of the flange B on which the tool 42 is mounted. The pin 66 is of the multiple-connector type and is electrically connected to sensors, electrical actuators and like devices on the tool 42.

The multiple connector 60 is electrically connected to proximity sensors, 70 and 72 respectively, associated with the rod 28a of the piston 28 and also to a proximity sensor 74 located on the frontal surface 14 of the holder member A, the functions of these sensors being explained in the following description.

First and second pairs of copper bars, indicated R and S respectively, are provided for the electrical power connection between the holder member A and the coupling flange B. Each bar 76 of the first pair R has a flat electrical contact portion 76a at one end disposed in correspondence with the central zone of the frontal surface 14 of the holder member 10, and an electrical connection portion 76b at its other end provided with a connector 78 for an electrical cable 79 connected to an electrical supply. Similarly, each bar 80 of the second pair S associated with the flange B has a flat electrical contact end portion 80a and an electrical connection portion 80b having a connector 82 for connection to an electrical power cable 84 connected to one of the electrodes Z of the welding gun 42.

In correspondence with the flat end portions 80a, the bars 80 have contact surfaces covered with a layer of silver in order to improve the effectiveness of the electrical contact.

Moreover, while the bars 80 of the second pair S are fixed rigidly to the flange B by fixing screws 88, the bars 76 of the second pair R can effect small adjustment movements and cup springs 90 are interposed between the bars 76 and the holder member A in order to ensure a predetermined contact pressure between the respective portions 76a and 80a of the bars 76 and 80, so as to ensure a smaller contact resistance and greater power supply to the welding gun 42.

A pressure plate 92 and shaped connecting members 94 are interposed between the cup springs 90 and the bars 76 respectively, to allow the bars 76 to effect small adjustment rotations. In their disconnected positions, the bars 76 are held against the holder member A by screws 96.

During the tool-charging phase, the arm 10 of the robot is located in correspondence with a floor support structure (not illustrated) for housing the tool 42. When this position is reached, compressed air is fed to the connector 24 communicating with the portion 26b of the cylindrical cavity 26 associated with the piston 28. Thus, the piston is urged towards the arm 10, causing the cranked levers 34 to rotate by virtue of the coupling between the ends 34a and the seats 32 of the rod 28a.

This rotation causes the radial translational movement of the movable teeth 36 which become disengaged from the seats 50a of the jaws 50 to cause the detachment of the coupling flange B from the holder member A under gravity. This detachment causes the closure of the obturators 22a and 48a of the rapid-engagement connectors 22 and 48, and also the opening of the electrical power contacts of the bars 76 and 80 and of the electrical connections 62 and 64 for the command and control signals for the tool 42.

In order to allow cleaning of the operating-fluid ducts in the tool, a flow of compressed air is fed to the connectors 22 to evacuate the ducts before the rod 28 is actuated.

The command for enabling the arm 10 of the robot to move after the release of the tool 42 is given by the proximity switch 70 which indicates the correct end-of-stroke position of the piston 28 relative to the complete withdrawal of the engagement teeth 36.

The arm 10 without the tool is then positioned in correspondence with another tool 42 deposited on a floor structure. The approach of the holder member A towards the flange B is effected so that the jaws 50 of the flange B slide in suitable seats 40 of the member A. The interruption of this approach movement, which is also guided by the pins 56, is commanded by the proximity sensor 74, which is resiliently mounted in order to increase the coupling precision.

During this phase, the automatic connectors 22 and 48 put the ducts in the tool 42 for the operating fluids, liquids, gas, compressed air, vacuum, etc., into communication with the lines T of the robot. Subsequently, compressed air is fed to the connector 24 communicating with the portion 26a of the inner cylindrical cavity 26 so as to cause the outward radial translational movement of the engagement teeth 36. The proximity switch 72 indicates when the piston 28 has reached its correct end-of-stroke position and ensures that the coupling flange B is clamped in the holder member A. When the enabling signal has been received from the sensor 72, the robot arm 10 can start its working cycle with the new tool 42. It is clear that the entire tool-changing phase, like the other working phases, is carried out wholly automatically by virtue of the work program of the robot stored in the control system of the robot itself.

It is understood that, the principle of the invention remaining the same, the constructional details and forms of embodiment may be varied widely with respect to that described and illustrated in the drawings, without thereby departing from the scope of the present invention.

For instance, the electrical power connection bars may be provided, for example, in a coaxial configuration instead of as flat surfaces.

What is claimed is:

1. An automatic tool-changing device for industrial robots provided with a tool-carrying arm, wherein it comprises:
 a cylindrical holder member supported by the tool-carrying arm,
 a coupling flange which has a shape substantially complementary to that of the holder member and to which a tool is fixed,
 movable engagement means associated with the holder member and comprising a plurality of movable engagement teeth disposed radially with respect to the holder member and slidable relative thereto, catch means associated with the flange and complementary to the movable engagement means, and actuator means carried by the holder member and associated with the movable engagement means to clamp the flange to or release it from the member, the actuator means comprising a double-acting piston having a rod and operated by pressurized fluid, a cylindrical seat within the holder member, in which the piston is housed, and a plurality of cranked levers articulated to the holder member, each lever being connected at one end to the rod of the piston and at its other end to the corresponding engagement tooth.

2. Device according to claim 1, wherein two proximity sensors are associated with the piston to detect signals indicative of the two end-of-stroke positions of the piston corresponding to the clamped and released conditions of the tool.

3. An automatic tool-changing device for industrial robots provided with a tool-carrying arm a cylindrical holder member supported by the tool-carrying arm, a coupling flange which has a shape substantially complementary to that of the holder member and to which a tool is fixed, movable engagement means including a plurality of movable engagement teeth associated with the holder member projecting radially and radially slidable relative to the flange, catch means associated with the flange and including a plurality of fixing appendages in the form of hooks having a shape complementary to that of the engagement teeth and projecting axially relative to the flange, a plurality of axial grooves on the cylindrical holder member for slidably receiving the fixing appendages, said grooves being disposed on the side surface of the holder member in correspondence with the movable teeth and complementary to the fixing appendages, and actuator means carried by the holder member and associated with the movable engagement means to clamp the flange to or release it from the member.

4. Device according to claim 3, wherein complementary axial rapid-engagement connectors for operating fluids are associated with the holder member and the flange and are provided with automatic valves for allowing flow in the coupled configuration of the member and the flange and for cutting-off the flow in the uncoupled configuration.

5. Device according to claim 3, wherein it includes a frontal proximity sensor carried by the holder member and arranged to detect a condition of correct coupling between the member and the flange in order to enable the tool to be clamped.

6. Device according to claim 3, provided with a double-acting piston, having a rod and operated by pressurized fluid, and a cylindrical seat within the holder member in which the piston is housed, wherein it comprises a plurality of cranked levers articulated to the holder member, each lever being connected at one end to the rod of the piston and at its other end to the corresponding engagement tooth.

7. Device according to claim 3, particularly for welding robots having a resistance-welding gun with electrodes, where a first pair of electrically-conductive parallel bars with flat frontal contact faces is associated with the cylindrical holder member and a second pair of electrically-conductive parallel bars with flat frontal faces complementary to corresponding flat frontal faces of said first pair is supported frontally by the flange, the bars of each pair of bars having first a portion located substantially in correspondence with the axis of the holder member and of the flange respectively, and second end portions opposite the first ends and projecting radially relative to the holder member and the flange respectively, the second end portion of the first pair of bars having a connector for electrical connection to an electrical supply and the second end portions of the second pair of bars being electrically connected to the electrodes of the welding gun.

8. Device according to claim 7, wherein resilient means are interposed between the first pair of bars and the cylindrical holder member in order to ensure a predetermined frontal contact pressure between the faces of the bars and to ensure an adjust movement during the coupling.

9. An automatic tool-changing device particularly for welding robots having a resistance-welding gun with electrodes provided with a tool-carrying arm, wherein it comprises:

a cylindrical holder member supported by the tool-carrying arm, a coupling flange which has a shape substantially complementary to that of the holder member and to which a tool is fixed, movable engagement means associated with the holder member, catch means associated with the flange and complementary to the movable engagement means, and actuator means carried by the holder member and associated with the movable engagement means to clamp the flange to or release it from the member, a first pair of electrically-conductive bars with flat frontal contact faces connected to the cylindrical holder member, a second pair of electrically-conductive bars with flat frontal faces complementary to corresponding flat faces of said first pair supported frontally by the flange, the first pair of bars being connected to an electrical supply and the second pair of bars being electrically connected to the electrodes of the welding gun.

10. Device according to claim 9, wherein resilient means are interposed between the first pair of bars and the cylindrical holder member in order to ensure a predetermined contact pressure between the faces of the bars in the condition in which the holder member and the flange are coupled together.

11. Device according to claim 9, wherein the bars of each pair of bars are parallel to each other and have first end portions located substantially in correspondence with the axis of the holder member and of the flange respectively, and second end portions opposite the first ends and projecting radially relative to the holder member and the flange respectively, each second end portion having a connector for its electrical connection.

12. Device according to claim 10, wherein the bars of the first pair of the bars can effect an adjustment movement during the coupling of their faces and the corresponding faces of the bars of the second pair.

13. Device according to claim 11, wherein the first end portions of the bars of the first pair have silvered electrical contact surfaces.

* * * * *